United States Patent
Allen et al.

(10) Patent No.: US 10,176,157 B2
(45) Date of Patent: *Jan. 8, 2019

(54) DETECT ANNOTATION ERROR BY SEGMENTING UNANNOTATED DOCUMENT SEGMENTS INTO SMALLEST PARTITION

(71) Applicant: International Business Machines Corporation, Armonk, NY (US)

(72) Inventors: Corville O. Allen, Morrisville, NC (US); Andrew R. Freed, Cary, NC (US); Kyungae Lim, Boxborough, MA (US)

(73) Assignee: International Business Machines Corporation, Armonk, NY (US)

(*) Notice: Subject to any disclaimer, the term of this patent is extended or adjusted under 35 U.S.C. 154(b) by 568 days.

This patent is subject to a terminal disclaimer.

(21) Appl. No.: 14/588,928

(22) Filed: Jan. 3, 2015

(65) Prior Publication Data

US 2016/0196249 A1    Jul. 7, 2016

(51) Int. Cl.
| | |
|---|---|
| *H03M 5/00* | (2006.01) |
| *H03M 7/00* | (2006.01) |
| *H03M 7/30* | (2006.01) |
| *H04L 1/00* | (2006.01) |
| *G06F 17/24* | (2006.01) |
| *G06F 17/30* | (2006.01) |
| *G06F 17/22* | (2006.01) |

(Continued)

(52) U.S. Cl.
CPC ........ *G06F 17/241* (2013.01); *G06F 17/2229* (2013.01); *G06F 17/30598* (2013.01); *G06F 17/211* (2013.01); *G06F 17/212* (2013.01); *G06F 17/2775* (2013.01); *G06F 17/3089* (2013.01)

(58) Field of Classification Search
CPC ..................................................... G06F 17/241
USPC ........................................................ 715/230
See application file for complete search history.

(56) References Cited

U.S. PATENT DOCUMENTS

| | | |
|---|---|---|
| 5,995,918 A | 11/1999 | Kendall et al. |
| 8,010,524 B2 | 8/2011 | Chen et al. |

(Continued)

FOREIGN PATENT DOCUMENTS

| | | |
|---|---|---|
| CN | 1525357 A | 9/2004 |
| CN | 103294653 A | 9/2013 |

(Continued)

OTHER PUBLICATIONS

"List of IBM Patents or Patent Applications Treated as Related," Letter from Leslie A. Van Leeuwen, Apr. 20, 2016, 1 page.

(Continued)

*Primary Examiner* — Cesar B Paula
*Assistant Examiner* — Luu-Phuong T Nguyen
(74) *Attorney, Agent, or Firm* — VanLeeuwen & VanLeeuwen; Diana R. Gerhardt

(57) ABSTRACT

An approach is provided in which a knowledge manager detects an annotation error while attempting to annotate a document and, as such, segments the document into multiple document segments. The knowledge manager then detects another annotation error while attempting to annotate the multiple document segments, resulting in a set of unannotated document segments. In turn, the knowledge manager generates a notification that identifies the set of unannotated document segments.

13 Claims, 8 Drawing Sheets

(51) Int. Cl.
*G06F 17/21* (2006.01)
*G06F 17/27* (2006.01)

(56) References Cited

U.S. PATENT DOCUMENTS

| | | | |
|---|---|---|---|
| 8,176,414 B1* | 5/2012 | Baluja | G06F 17/30905 715/234 |
| 8,275,762 B2 | 9/2012 | Gupta et al. | |
| 8,280,719 B2 | 10/2012 | Miller | |
| 8,442,951 B1 | 5/2013 | Brannon et al. | |
| 8,539,349 B1 | 9/2013 | Kirshenbaum | |
| 8,706,729 B2 | 4/2014 | Welinder et al. | |
| 9,017,460 B2 | 4/2015 | Minato | |
| 9,058,317 B1* | 6/2015 | Gardner | G06N 99/005 |
| 9,245,009 B2 | 1/2016 | Clark et al. | |
| 2003/0004942 A1 | 1/2003 | Bird | |
| 2004/0172594 A1* | 9/2004 | Jones | G06F 17/2247 715/232 |
| 2004/0261016 A1* | 12/2004 | Glass | G06F 17/30014 715/230 |
| 2005/0154600 A1 | 7/2005 | Feygenson et al. | |
| 2005/0177557 A1* | 8/2005 | Ziauddin | G06F 17/30306 |
| 2006/0265351 A1* | 11/2006 | Day | G06F 17/30522 |
| 2006/0271371 A1 | 11/2006 | Tsuboi | |
| 2007/0043774 A1 | 2/2007 | Davis et al. | |
| 2007/0282777 A1* | 12/2007 | Guralnik | G05B 23/0254 706/48 |
| 2008/0115107 A1 | 5/2008 | Arguelles et al. | |
| 2008/0294443 A1 | 11/2008 | Eide et al. | |
| 2008/0313144 A1 | 12/2008 | Huston | |
| 2009/0287678 A1 | 11/2009 | Brown et al. | |
| 2010/0100697 A1 | 4/2010 | Nomura | |
| 2010/0179930 A1 | 7/2010 | Teller et al. | |
| 2011/0035345 A1 | 2/2011 | Duan et al. | |
| 2011/0052063 A1 | 3/2011 | McAuley et al. | |
| 2011/0066587 A1 | 3/2011 | Ferrucci et al. | |
| 2011/0125734 A1 | 5/2011 | Duboue et al. | |
| 2012/0022872 A1 | 1/2012 | Gruber et al. | |
| 2012/0072204 A1 | 3/2012 | Nasri et al. | |
| 2012/0301864 A1 | 11/2012 | Bagchi et al. | |
| 2012/0303894 A1 | 11/2012 | Zwisler et al. | |
| 2013/0007055 A1 | 1/2013 | Brown et al. | |
| 2013/0018652 A1 | 1/2013 | Ferrucci et al. | |
| 2013/0041863 A1 | 2/2013 | Schmidtler et al. | |
| 2013/0042200 A1 | 2/2013 | Armitage | |
| 2013/0066886 A1 | 3/2013 | Bagchi et al. | |
| 2013/0151476 A1 | 6/2013 | Brannon | |
| 2013/0246315 A1 | 9/2013 | Joshi et al. | |
| 2013/0325820 A1 | 12/2013 | Grube et al. | |
| 2013/0346409 A1 | 12/2013 | Welinder et al. | |
| 2014/0074845 A1 | 3/2014 | Dimassimo et al. | |
| 2014/0321291 A1* | 10/2014 | Chen | H04L 41/0206 370/241 |
| 2015/0074507 A1 | 3/2015 | Riediger et al. | |
| 2016/0019462 A1 | 1/2016 | Allen et al. | |

FOREIGN PATENT DOCUMENTS

| | | |
|---|---|---|
| CN | 103970645 A | 8/2014 |
| WO | 009523373 | 8/1995 |
| WO | 2007139999 | 12/2007 |
| WO | 2010026391 | 3/2010 |
| WO | 2011038021 | 3/2011 |

OTHER PUBLICATIONS

Grace et al., "Artist Ranking through Analysis of Online Community Comments," IBM Research Report, International Business Machines Corporation, 2008, 11 pages.

Prager et al, "Question-Answering by Predictive Annotation," IBM T.J. Watson Research Center, 2000, 8 pages.

McCord et al., "Deep Parsing in Watson," IBM J. Res. & Dev. vol. 56, No. 3/4, Paper 3, May/Jul. 2012, pp. 3:1-3:15.

Allen et al., "Reprocess Problematic Sections of Input Documents," U.S. Appl. No. 14/868,816, filed Sep. 29, 2015, 36 pages.

"List of IBM Patents or Patent Applications Treated as Related," Letter from Leslie A. Van Leeuwen, Sep. 29, 2015, 2 pages.

Jan. 3, 2015, U.S. Appl. No. 14/588,928.

May 1, 2014, U.S. Appl. No. 14/266,959.

Andrews et al., "COALA: A Tool for Inter-document Coreference Resolution Evaluation," American, Association for Artificial Intelligence, 2006, 6 pages.

High, "The Era of Cognitive Systems: An Inside Look at IBM Watson and How it Works," IBM Corporation, Redbooks, Dec. 2012, 16 pages.

IBM, "System and Method for Improving Ingestion Rate of Data Stores," www.ip.com, IP.com No. IPCOM000175631D, Oct. 16, 2008, 10 pages.

Looks et al., "Streaming Hierarchical Clustering for Concept Mining," IEEE 2007, 12 pages.

Yuan, "Watson and healthcare, How natural language processing and semantic search could revolutionize clinical decision support," IBM developerWorks, IBM Corporation, Apr. 12, 2011, 14 pages.

Zhu et al., "IBM Content Manager OnDemand Guide," ibm.com/redbooks, IBM Corporation, Oct. 2013, 536 pages.

Allen et al., "Predicting and Enhancing Document Ingestion Time" U.S. Appl. No. 14/266,959, filed May 1, 2014, 38 pages.

"U-Compare User Guide," Database Center for Life Science, Japan, Apr. 2011, 8 pages.

* cited by examiner

Log Table 600

| ANNOTATOR | FEATURE SET | TIME |
|---|---|---|
| A | semantic text annotator | 20ms/page |
| B | image annotator | 10ms/image |
| C | syntactic text annotator | 1 ms/sentence |

DETECT ANNOTATION ERROR BY SEGMENTING UNANNOTATED DOCUMENT SEGMENTS INTO SMALLEST PARTITION

BACKGROUND

A question answer system answers questions posed in a natural language format by applying advanced natural language processing, information retrieval, knowledge representation, automated reasoning, and machine learning technologies. Question answer systems differ from typical document search technologies because document search technologies return a list of documents ranked in order of relevance to a word query, whereas a question answer system receives a question expressed in a natural language, analyzes the question in a natural language context, and returns a precise answer to the question.

To prepare a question answer system to receive questions and provide precise answers, software developers train the question answer system to specific domains such as a financial domain, a travel domain, a medical domain, etc. During the training process, the question answer system ingests a corpus of documents from trusted, traditional sources (textbooks, journals) that include accurate information. During document ingestion, the question answer system uses annotators to add annotations to the document that the question answer system eventually utilizes to identify and return precise answers to questions.

BRIEF SUMMARY

According to one embodiment of the present disclosure, an approach is provided in which a knowledge manager detects an annotation error while attempting to annotate a document and, as such, segments the document into multiple document segments. The knowledge manager then detects another annotation error while attempting to annotate the multiple document segments, resulting in a set of unannotated document segments. In turn, the knowledge manager generates a notification that identifies the set of unannotated document segments.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 6 is an exemplary log table that includes configuration properties of annotators that the knowledge manager logs while the annotators are annotating baseline documents;

DETAILED DESCRIPTION

Figure 1:
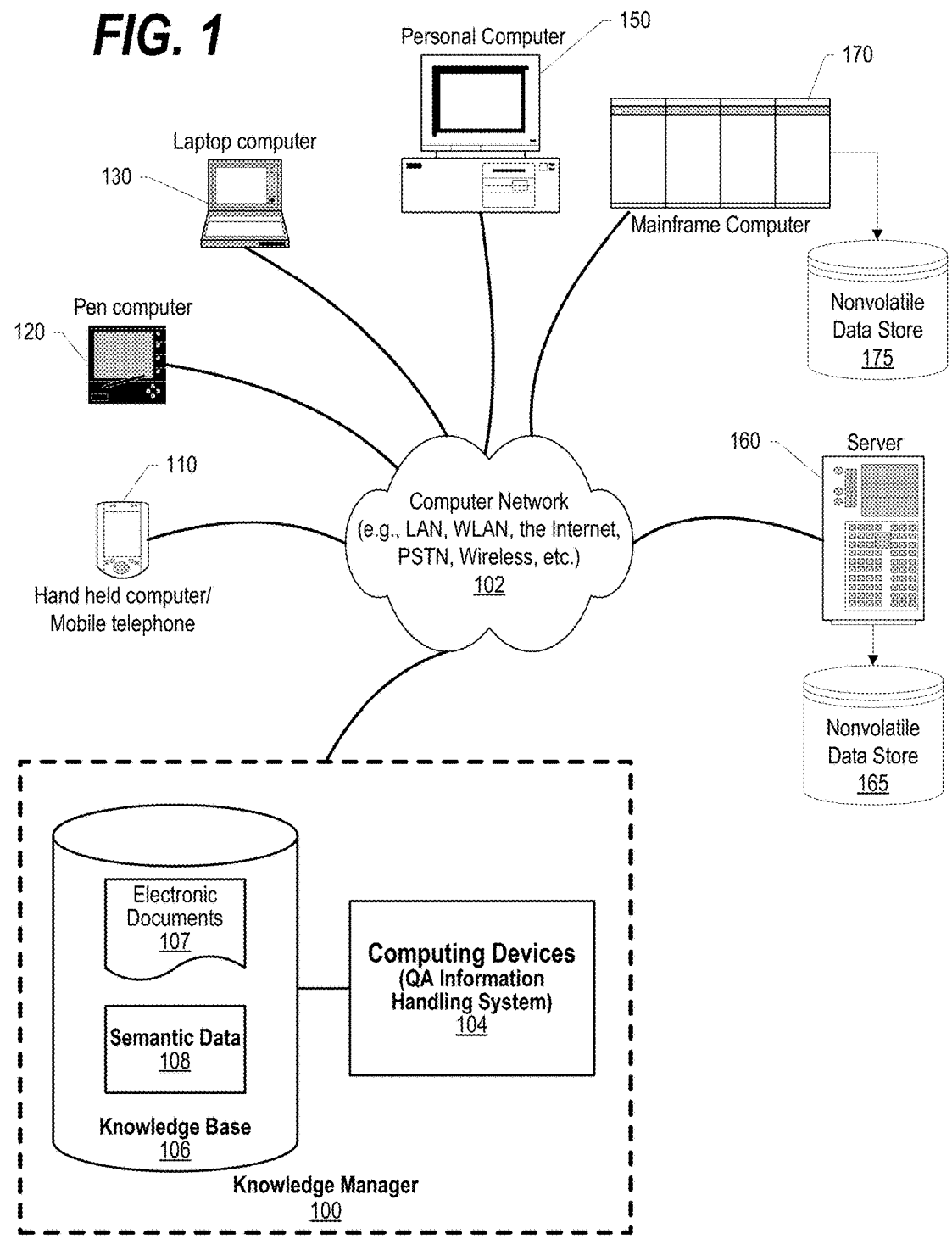
FIG. 1 depicts a schematic diagram of one illustrative embodiment of a knowledge manager system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then segments to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
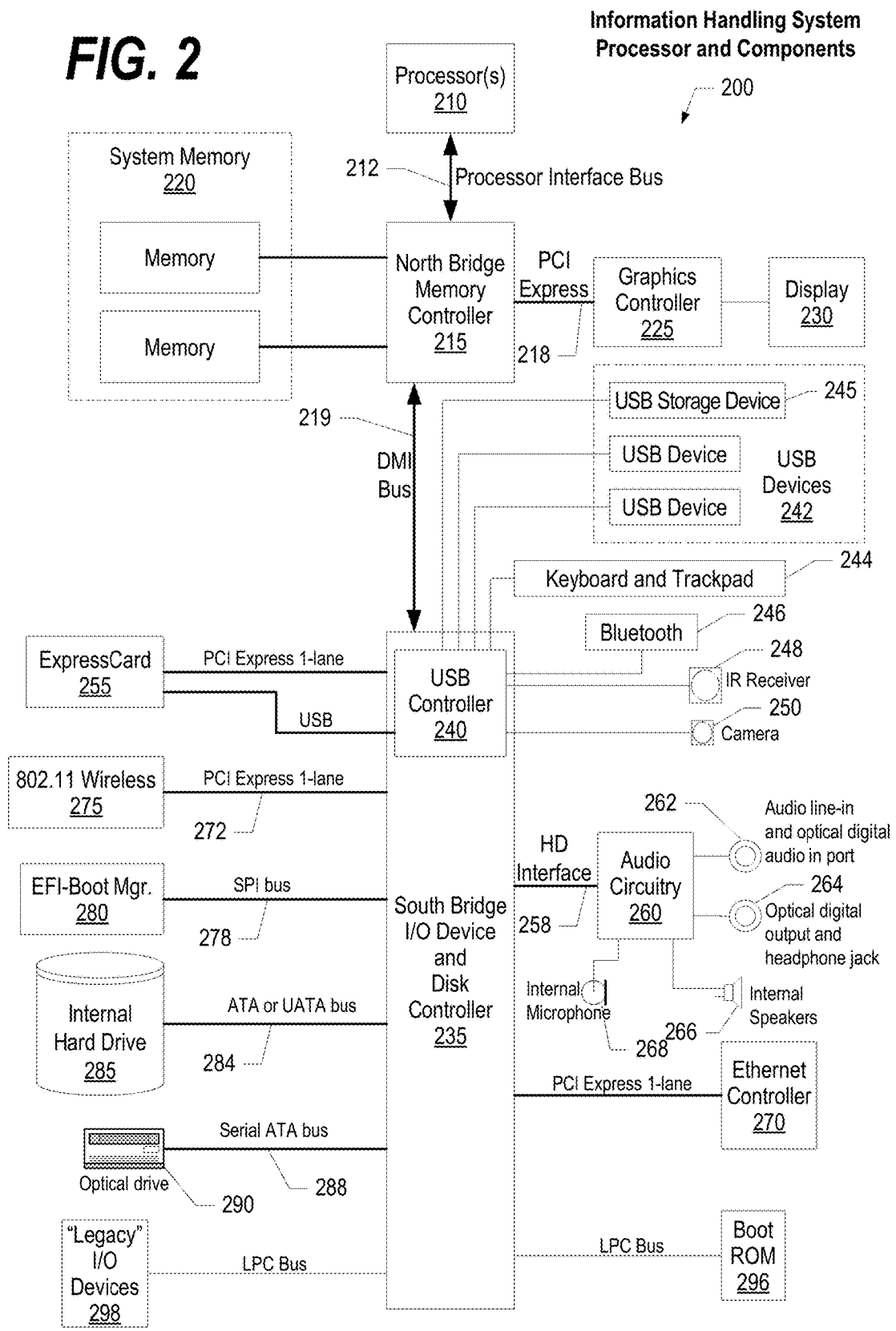
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212.

Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system. The information handling system detects an annotation error while attempting to annotate a document. As such, the information handling system iteratively segments the document into smaller and smaller document segments to pinpoint the location in the document that is causing the error. In turn, a software developer is able to analyze a small segment of the document causing the error instead of searching through the entire document.

Figure 3:
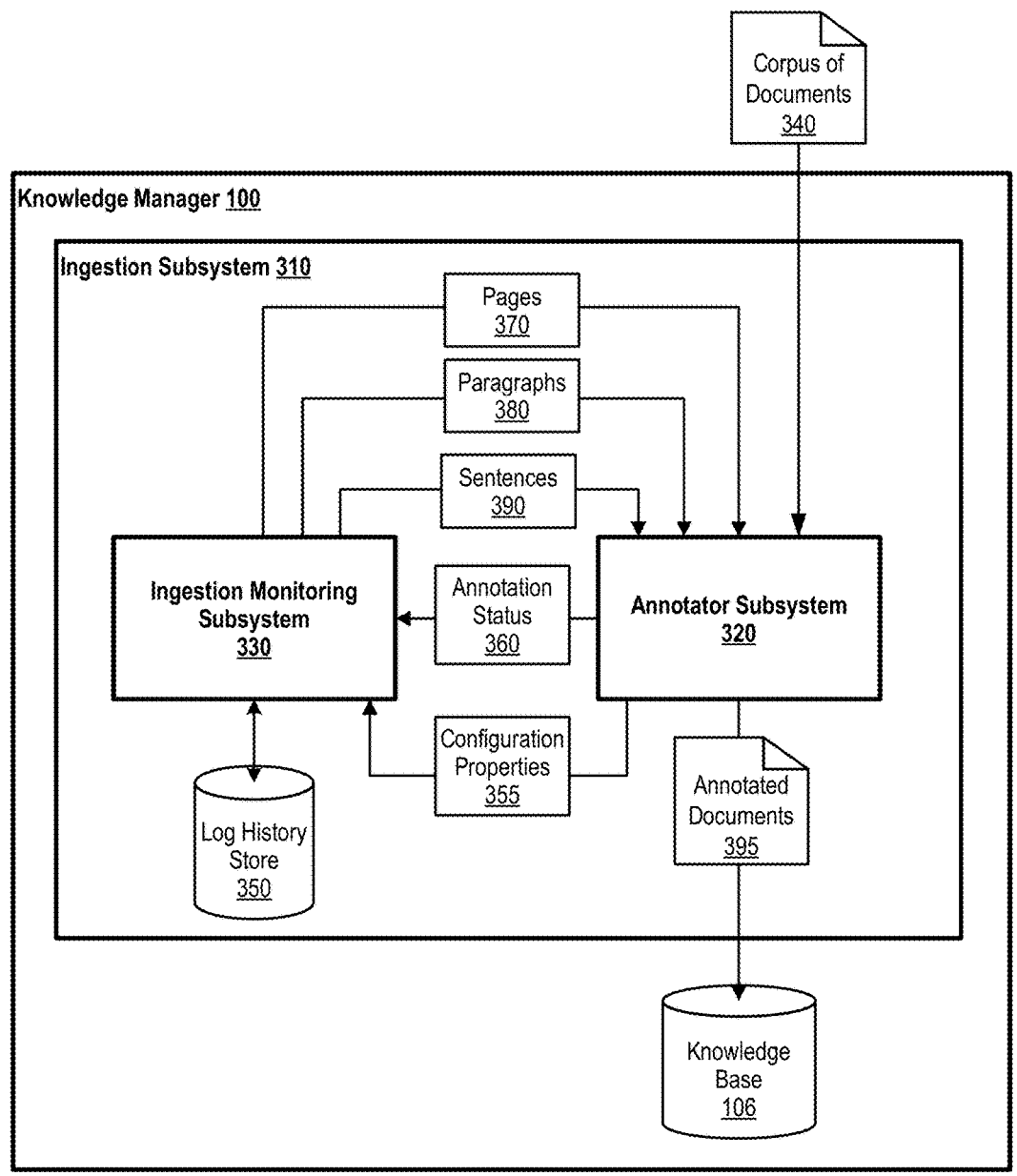
FIG. 3 is an exemplary diagram depicting a knowledge manager iteratively annotating a document to identify a location in the document that attributes to an annotation error.

FIG. 3 is an exemplary diagram depicting a knowledge manager iteratively annotating a document to identify a location in the document that attributes to an annotation error. Knowledge manager 100 ingests documents 340 into knowledge base 106 using ingestion subsystem 310. In one embodiment, corpus of documents 340 corresponds to a particular domain, such as a medical domain, financial domain, etc., and knowledge manager 100 subsequently utilizes knowledge base 106 to answer questions or provide information specific to the domain.

Ingestion subsystem 310 includes annotator subsystem 320 and ingestion monitoring subsystem 330. Annotator subsystem 320 includes annotators that annotate corpus of documents 340 using natural language processing techniques to produce annotated documents 395. In one embodiment, annotator subsystem 320 includes multiple annotators corresponding to multiple annotation types, such as a text annotator, an image annotator, a semantic annotator, a syntactic annotator, etc.

Ingestion monitoring subsystem 330 monitors annotator subsystem 320 for errors, failures, delays, or other issues that the annotators may encounter while annotating one of corpus of documents 340. As defined herein, the terms "annotation error" or "error" encompass annotator errors, failures, delays, or other issues from an annotator during annotation.

Prior to monitoring annotator subsystem 320 for errors, ingestion subsystem 310 proceeds through an annotator baseline stage that involves logging a baseline amount of time that annotator subsystem 320 takes to annotate a portion of corpus of documents 340 (e.g., baseline documents). During the baseline stage, annotator subsystem 320 annotates a portion of corpus of documents 340 and provides configuration properties 355 to ingestion monitoring subsystem 330, which includes annotator feature sets (text annotation, image annotation, etc.), their baseline annotation times, and their smallest segment size that the annotators are configured to annotate. For example, annotator subsystem 320 may configure a semantic annotator to annotate down to a paragraph level and a syntactic annotator may be configured to annotate down to a sentence level. As such, ingestion monitoring subsystem 330 stores the baseline configuration properties in log history store 350 (see FIGS. 5, 6, and corresponding text for further details).

Ingestion monitoring subsystem 330 is now equipped to monitor annotator subsystem 320 during document annotations. Annotator subsystem 320 selects one of corpus of documents 340 and attempts to annotate the selected document, such as at the document level. Annotator subsystem 320 sends annotation status 360 to ingestion monitoring subsystem 330, which includes a document feature set of the selected document, such as the size and contents of the document. Ingestion monitoring subsystem 330 searches log history store 350 for comparable annotator feature sets and computes an estimate amount of time that annotator subsystem 320 should take to annotate the selected document. For example, if the document feature set indicated that the selected document is five pages long, ingestion monitoring subsystem 330 may locate a baseline annotator entry in log history store 350 that indicates annotator Z annotates at 10 milliseconds per page. In this example, ingestion monitoring subsystem estimates that the annotation time to annotate a five-page document is 50 milliseconds.

Ingestion monitoring subsystem 330 receives annotation status 360 during the document annotation, which may include an error, a failure, or an in-process annotation time that is longer than the estimated annotation time. As such, ingestion monitoring subsystem 330 segments the selected document, or instructs annotator subsystem 320, into smaller document segments. For example, if the document is currently being annotated at the document level, ingestion monitoring subsystem 330 segments the document into pages 370 and annotator subsystem 320 attempts to annotate on an individual page level. If an error occurs when annotating a document segment, the document segment is not completely annotated and, as such, is referred to herein as an unannotated document segment.

Ingestion monitoring subsystem 330 segments the unannotated document segments into even smaller document segments (e.g., paragraphs 380 or sentences 390) based upon a smallest segment size that a corresponding annotator is configured to annotate. In turn, annotator subsystem 320 may iteratively segment and annotate document segments down to the smallest segment size and pinpoint the error location. As a result, a software developer may analyze a small portion of the document (e.g., sentence) causing the error instead of analyzing the entire document (see FIG. 4 and corresponding text for further details).

Figure 4:
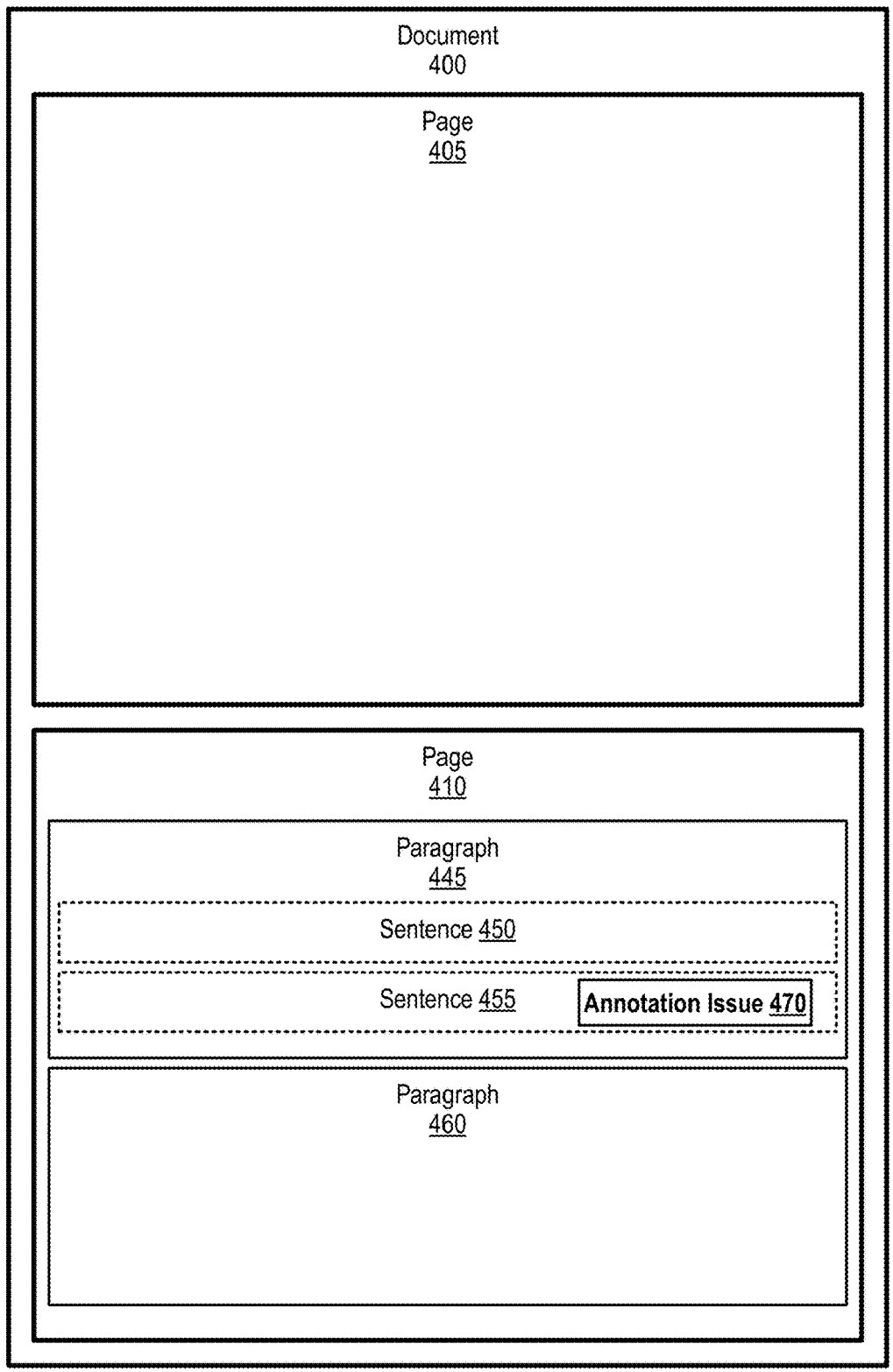
FIG. 4 is an exemplary diagram depicting a document that a knowledge manager iteratively segments into document segments to pinpoint an area in the document attributing to an annotation error.

FIG. 4 is an exemplary diagram depicting a document that a knowledge manager iteratively segments into document segments to pinpoint an area in the document attributing to an annotation error. Document 440 is included in corpus of document 340, which ingestion subsystem 310 selects to annotate. While annotating document 400, ingestion subsystem 310 detects an annotation error. As such, ingestion subsystem 310 segments the document into pages 405 and 410.

Ingestion subsystem 310 annotates page 405 and 401, and determines that page 405 annotated correctly but page 410 generated an annotation error. As such, ingestion subsystem segments page 410 into paragraphs 445 and 460. Ingestion subsystem 310 annotates paragraphs 445 and 460 and determines that paragraph 460 annotated correctly but paragraph 445 generated an error. As such, and assuming that the annotator is configured to annotate at the sentence level, ingestion subsystem 310 segments paragraph 445 into sentences 450 and 455.

Ingestion subsystem 310 determines that sentence 450 annotates correctly but sentence 455 generates an error. As a result, knowledge manager 100 generates a notification to a software developer that the location of annotation issue 470 is within sentence 455. In turn, the software developer is not required to spend an over abundant of time analyzing the entire document 400 and, instead, can spend a short amount of time analyzing and correcting sentence 455.

Figure 5:
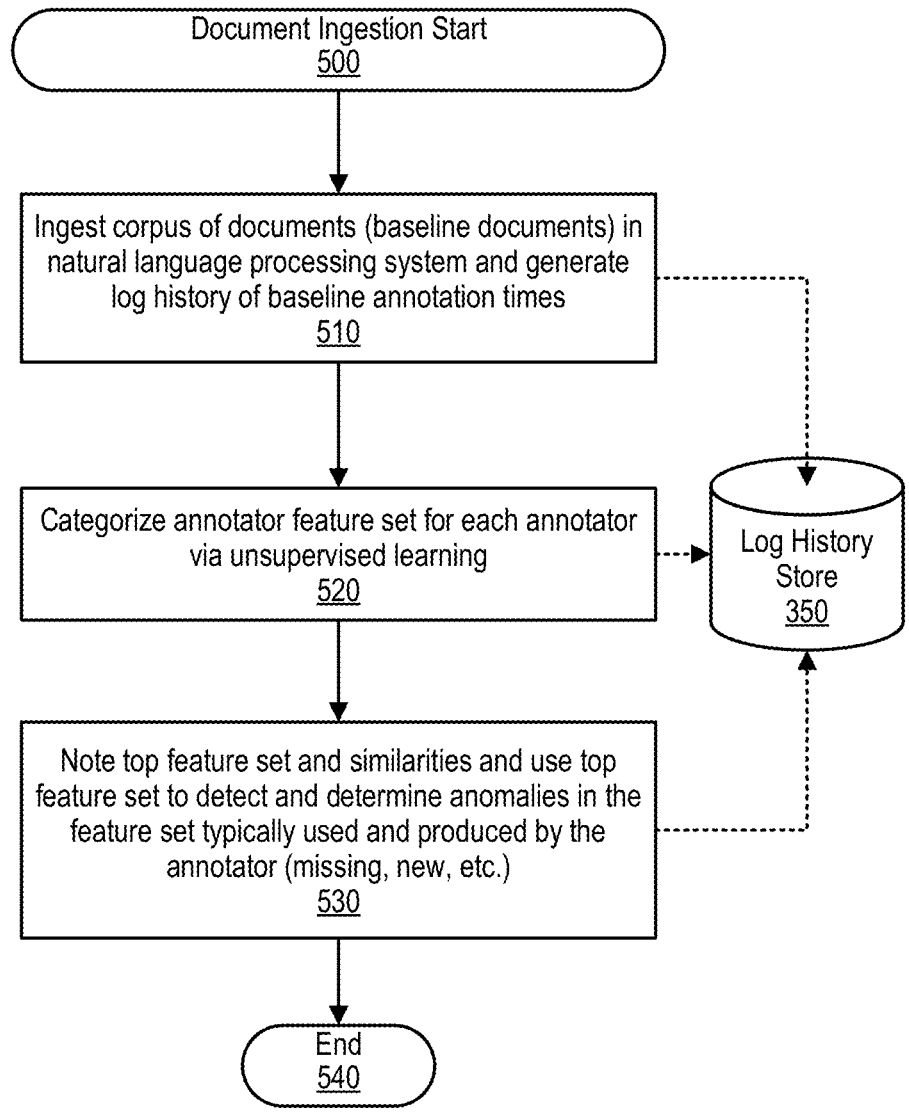
FIG. 5 is an exemplary flowchart showing steps taken by a knowledge manager to track annotation times and feature sets of annotators during a baseline document ingestion process.

FIG. 5 is an exemplary flowchart showing steps taken by a knowledge manager to track annotation times and feature sets of annotators during a baseline document ingestion process. In one embodiment, the process ingests a portion of a corpus of documents to understand the capabilities of the knowledge manager's annotators. For example, the process may have several annotators responsible for different types of annotations, and the process ingests a portion of the documents to determine an amount of time that the annotators typically require to annotate a document and their corresponding annotator feature sets (e.g., text, image, etc.).

Processing commences at 500, whereupon the process ingests a portion of the corpus of documents in natural language processing system and generates a log history of baseline annotation times (step 510). For example, the process may have each annotator annotate five documents and take an average of the annotation times. At step 520, the process categorizes the annotation feature sets for each annotator via unsupervised learning to predict the time to run a given document through a given annotator.

At step 530, the process notes the top annotation feature sets and similarities and uses the top feature set to detect and determine anomalies in the feature set typically used and produced by the annotator. For example, when a medical table ingesting annotator parses a medical related table, fifteen annotations may be related to table parsing, columns, positions, topics, row and column associations, etc., and forty additional annotations may be medical related annotations. The process analyzes these sets of annotations associated with the annotator to learn about the annotator's behavior (e.g., when and how the annotator produces the annotations). Continuing with this example, the medical table ingesting annotator uses three hundred incoming annotations to help processing and also become features for a machine learning system. In one embodiment, the annotator may be problematic when a majority of highly weighted features to the annotator are missing from a new document or a new set of documents. This may also help trigger what type of re-ingestion is required and how far back to start processing due to the missing significant annotations.

Figure 7:
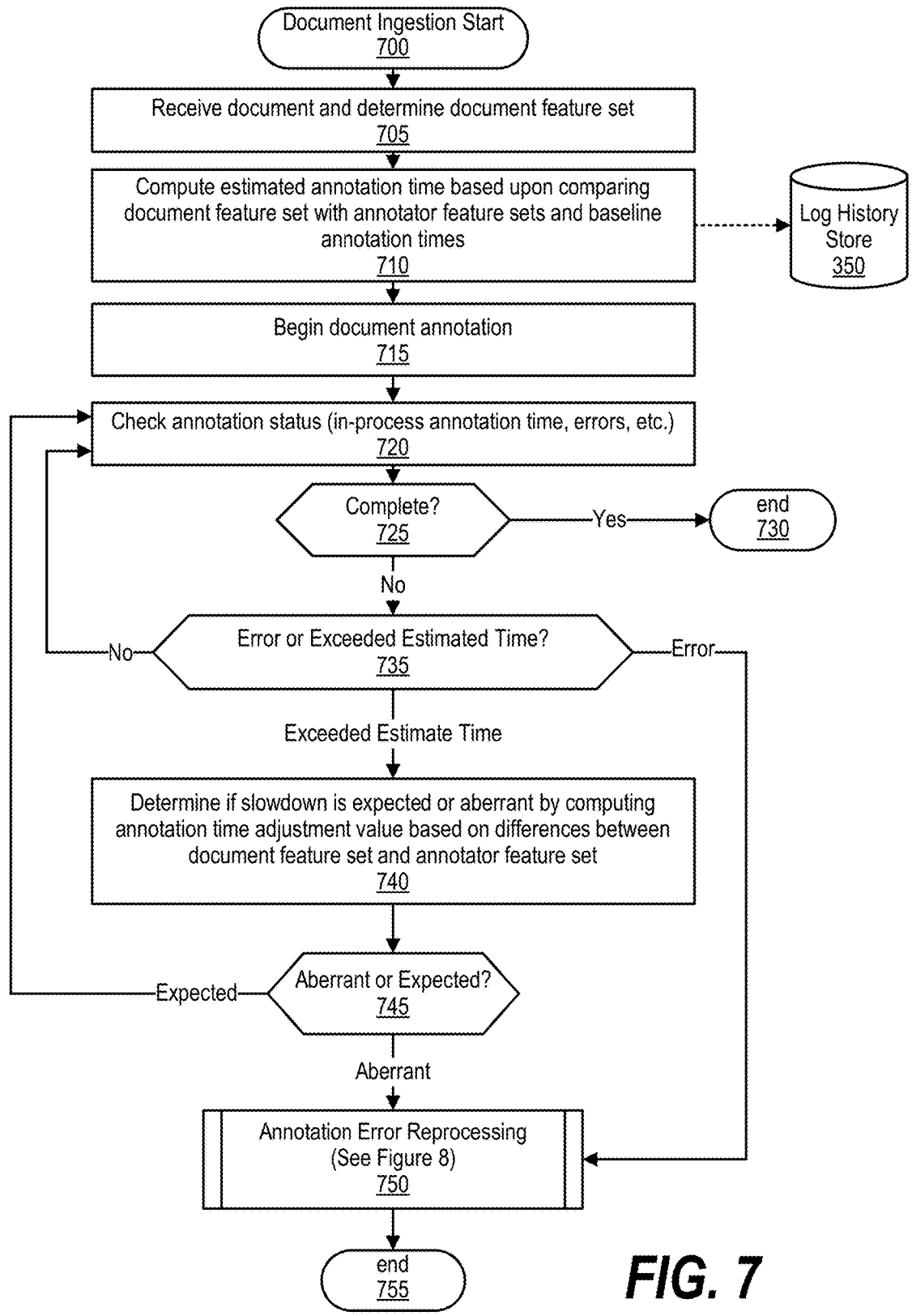
FIG. 7 is an exemplary flowchart showing steps taken by a knowledge manager to ingest documents into a knowledge base.

FIG. 5 processing thereafter ends at 540 and the knowledge manager is now equipped to estimate the amount of time the annotators will take to annotate subsequent documents (see FIG. 7 and corresponding text for further details).

FIG. 6 is an exemplary log table that includes configuration properties of annotators that the knowledge manager logs while the annotators are annotating baseline documents. Log history store 350 includes log table 600, which has three entries corresponding to three different annotators utilized by annotator subsystem 320. As those skilled in the art can appreciate, log table 600 may include more or less entries than what FIG. 6 depicts.

Log table 600 includes a list of annotator identifiers in column 610. In one embodiment, the annotator identifiers correspond to the type of annotator, such as "image," "syntactic," etc. Column 620 includes annotator feature sets of the particular annotators, such as a size of document, number of input annotation X, number of input annotation Y, etc. In one embodiment, processing time depends upon on how many input annotations a document has to process as well as the overall text size.

Column 630 includes baseline annotation times of the annotators. For example, annotator A annotates a page of text in 20 milliseconds. As such, when ingestion subsystem 310 receives a page of text to annotate with annotator A and the annotation takes longer than 20 ms, ingestion subsystem 310 determines whether the delay is an expected delay or whether the delay is due to, for example, a malfunction of the annotator (see FIG. 7 and corresponding text for further details).

FIG. 7 is an exemplary flowchart showing steps taken by a knowledge manager to ingest documents into a knowledge base. Processing commences at 700, whereupon the process receives a document and determines the document's feature set (step 705). For example, the document may include 20 pages of text and 10 images. At step 710, the process compares the document feature set with annotator feature sets (generated in FIG. 5) included in log history store 350 to select annotators to annotate the document. The process then computes an estimated annotation time to annotate the document (step 710). For example, if the process identified an annotator that previously annotated a document with five pages and five drawings in X milliseconds, the process estimates that the time to annotate the ten pages and ten drawings at 2X.

At step 715, the process begins document annotation using the selected annotators. At step 720, the process checks the annotation status, such as checking the in-process annotation time and whether the annotation has completed. The process determines as to whether the annotators have completed annotating the document (decision 725). If the document annotation is complete, then decision 725 branches to the 'yes' branch whereupon processing ends at 730. In one embodiment, the process loops back to step 705 to receive and annotate another document.

On the other hand, if the annotators have not finished annotating the document, then decision 725 branches to the 'no' branch. The process determines as to whether the annotators generated an error (failed) or exceeded the estimated annotation time computed in step 710 (decision 735). If an error/failure has not occurred or the estimate time has not been exceeded, then decision 735 branches to the "no" branch, which loops back to continue monitoring the annotation process.

Figure 8:
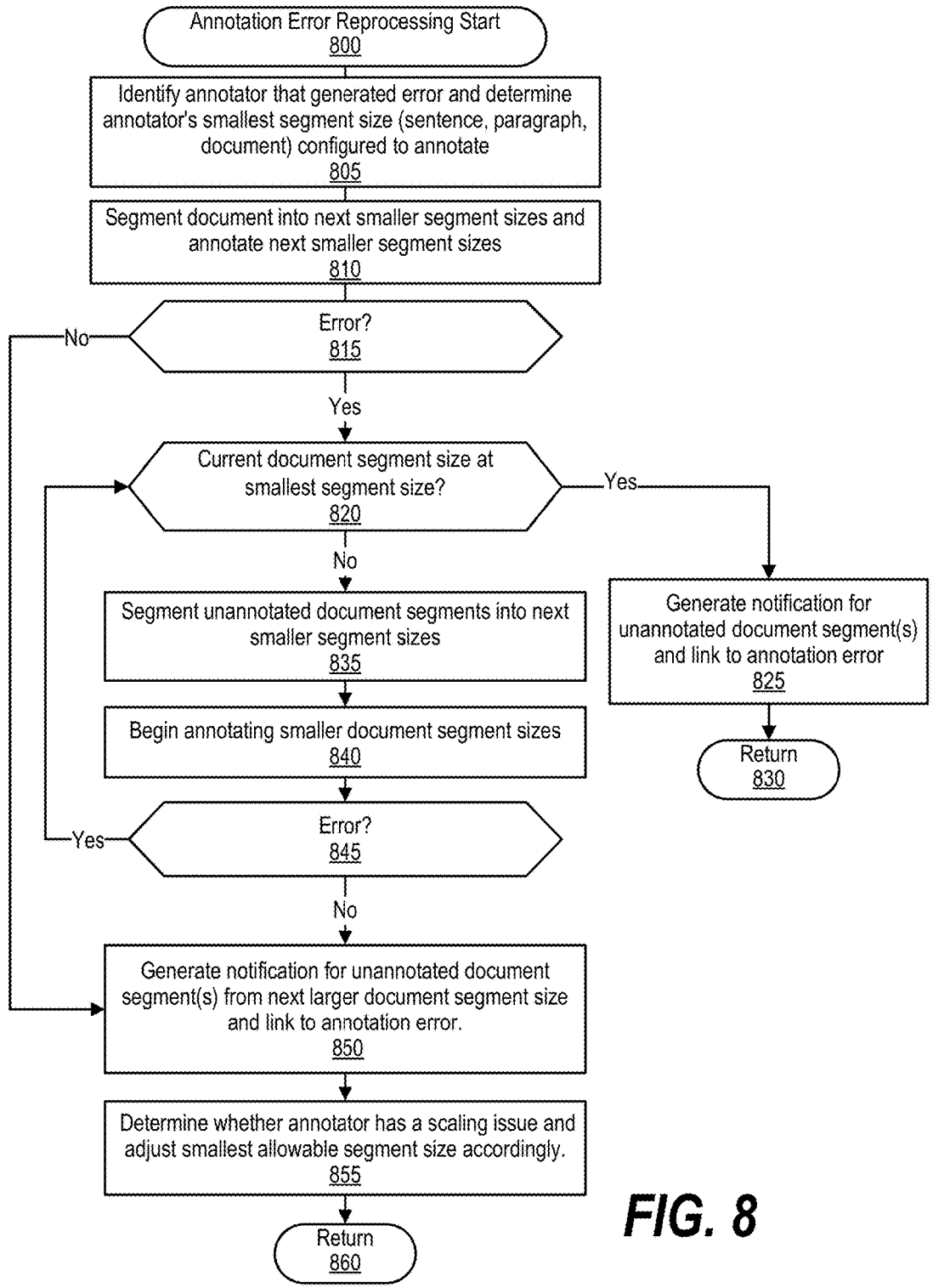
FIG. 8 is an exemplary flowchart showing steps taken by a knowledge manager to iteratively segment and annotate a document to locate a document segment attributing to an annotation error.

On the other hand, if the annotators failed or generated an error, then decision 735 branches to the "error" branch, whereupon the process, at predefined process 750, performs iterative annotation error reprocessing steps to pinpoint a location in the document that attribute to the annotation error (see FIG. 8 and corresponding text for processing details).

On the other hand, if the annotators have not generated an error or failed, but the in-process annotation time exceeds the estimate annotation time, decision 735 branches to the "exceeded estimate time" branch. At step 740, the process determines if the extended annotation time is an expected extension or an aberrant problem by, in one embodiment, re-computing the annotation time adjustment value based on differences between document feature set and annotator feature set.

The process determines as to whether the annotation delay is an aberrant delay or an expected delay (decision 745). If the delay is an expected delay, such as due to the document having computation intensive images, then decision 745 branches to the 'expected' branch, which loops back to continue monitoring the annotation process. On the other hand, if the delay is an aberrant delay, such as due to the annotator stuck on attempting to annotate a section of the document, then decision 745 branches to the 'aberrant' branch. At predefined process 750, the process performs iterative annotation error reprocessing steps to pinpoint a location in the document that is causing issues (see FIG. 8 and corresponding text for processing details). FIG. 7 processing thereafter ends at 755.

FIG. 8 is an exemplary flowchart showing steps taken by a knowledge manager to iteratively segment and annotate a document to locate a document segment attributing to an annotation error. Processing commences at 800, whereupon the process identifies an annotator corresponding to the annotation error and determines the annotator's smallest segment size included in the annotators configuration properties (step 805). In one embodiment, the smallest segment size may be a sentence, a paragraph, a complete document, an amount of words, etc.

At step 810, the process segments the document into document segments and attempts to annotate the document segments accordingly. For example, assuming the document's document segment size has not reached the annotator's smallest segment size, the process may segment the document into pages and then annotate the pages on an individual basis to determine which pages pass annotation and which pages generate an error.

The process determines as to whether an error occurred while annotating the document segments (decision 815). In one embodiment, the process determines whether an error occurred based on steps 720-745 shown in FIG. 7. If an error did not occur while annotating each of the document segments, then decision 815 branches to the 'no' branch.

At this point, since the document generated an error but none of the document segments generated an error, the process, or annotators, may have a scaling issue. As such, at step 850, the process generates a notification for the document segment (e.g., entire document) that was not fully annotated prior to segmenting in step 810, and links the unannotated document segment to the annotation error. At step 855, the process analyzes the errors to determine whether to adjust the annotators smallest segment size. For example, if the annotator generates an error at the document level but does not generate an error at the page level, the process may make the annotators' smallest segment size at the document level (assuming an error actually exists in the document).

Referring back to decision 815, if the annotator still produces errors from annotating the document segments, decision 815 branches to the 'yes' branch. The process determines as to whether the current document segment size is at the annotator's smallest segment size (decision 820). For example, if the current document segment size is at the page level but the annotator's smallest segment size is at the sentence level, then the process may segment the unannotated document segments causing the error into smaller segments.

If the document segment size is not at the annotator's smallest segment size, then decision 820 branches to the 'no' branch. At step 835, the process identifies the document segments that are still generating annotation errors (unannotated document segments) and segments the unannotated document segments into the next smaller segment sizes.

At step 840, the process annotates the smaller document segments, and determines as to whether any of the smaller document segments generated an error (decision 845). If error is found, then decision 845 branches to the 'yes' branch, which loops back to determine whether the current document segment size is at the smallest segment size (decision 820). For example, if the current document size is at the paragraph level and annotator's smallest segment size is at the paragraph level, then decision 820 branches to the 'yes' branch and the process generates a notification for the uningested document segments causing the error and links the unannotated document segments to the annotation error. Processing thereafter returns to FIG. 7 at 830.

Referring back to decision 845, if an error is not found from annotating the smaller document segments, then decision 845 branches to the 'no' branch. At this point, as discussed above, since an unannotated document segment generated an error prior to the segmenting step in step 835 but the segmented document segments do not generate an error, the process, or annotator, may have a scaling issue. As such, at step 850, the process generates a notification for the unannotated document segment that was not fully annotated prior to segmenting in step 835, and links the unannotated document segment to the annotation error. At step 855, the process analyzes the errors to determine whether to adjust the annotators smallest segment size, and FIG. 8 processing thereafter returns to the calling routine (see FIG. 7) at 860.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
   one or more processors;
   a memory coupled to at least one of the processors; and
   a set of computer program instructions stored in the memory and executed by at least one of the processors in order to perform actions of:
   detecting a first annotation error generated by an annotator while annotating a first document segment;
   in response to detecting the first annotation error, segmenting the first document segment into a plurality of second document segments;
   detecting one or more second annotation errors generated by the annotator while annotating at least one of the plurality of second document segments, resulting in one or more unannotated second document segments; and
   in response to detecting the one or more second annotation errors, generating a notification that identifies at least one of the one or more unannotated second document segments.

2. The information handling system of claim 1 wherein the one or more processors perform additional actions comprising:
   identifying a smallest segment size of the annotator, wherein the smallest segment size corresponds to a smallest document partition that the annotator is configured to annotate;
   selecting one of the unannotated second document segments; and
   segmenting the selected unannotated second document segment into a plurality of third document segments in response to determining that the selected unannotated second document segment is larger than the smallest segment size.

3. The information handling system of claim 2 wherein the one or more processors perform additional actions comprising:
   detecting a third annotation error in response to attempting to annotate a selected one of the plurality of third document segments;
   segmenting the selected third document segment into a plurality of fourth document segments that each correspond to the smallest segment size;
   determining that a selected one of the plurality of fourth document segments generates a fourth annotation error; and
   including an identifier in the notification that identifies the selected fourth document segment.

4. The information handling system of claim 2 wherein the one or more processors perform additional actions comprising:
   annotating each of the plurality of third document segments;
   determining that the annotator successfully annotated each of the plurality of third document segments; and
   modifying the smallest segment size to correspond with the selected unannotated second document segment in response to the determining.

5. The information handling system of claim 1 wherein, prior to the detection of the first annotation error, the one or more processors perform additional actions comprising:
   annotating, by the annotator, one or more baseline documents included in a corpus of documents;
   logging a baseline annotation time of the annotator based upon the annotating of the one or more baseline documents; and
   logging an annotator feature set corresponding to the annotator, wherein the annotation feature set includes at least one document size and at least one amount of annotations corresponding to at least one of the one or more baseline documents.

6. The information handling system of claim 5 wherein the one or more processors perform additional actions comprising:
   identifying a document feature set of the first document segment;
   computing an estimated annotation time to annotate the document based upon the baseline annotation time in response to determining that the document feature set matches the annotator feature set;
   monitoring a current in-process annotation time taken by the annotator while in-process of annotating the first document segment; and generating the first annotation error in response to determining that the in-process annotation time is longer than the estimated annotation time.

7. The information handling system of claim 6 wherein the one or more processors perform additional actions comprising:
computing an annotation time adjustment value by comparing the document feature set against the annotator feature set; and
generating the first annotation error in response to determining that the in-process annotation time is longer than a combination of the estimated annotation time and the annotation time adjustment value.

8. A computer program product stored in a non-transitory computer readable storage medium, comprising computer program code that, when executed by an information handling system, causes the information handling system to perform actions comprising:
detecting a first annotation error generated by an annotator while annotating a first document segment;
in response to detecting the first annotation error, segmenting the first document segment into a plurality of second document segments;
detecting one or more second annotation errors generated by the annotator while annotating at least one of the plurality of second document segments, resulting in one or more unannotated second document segments; and
in response to detecting the one or more second annotation errors, generating a notification that identifies at least one of the one or more unannotated second document segments.

9. The computer program product of claim 8 wherein the information handling system performs additional actions comprising:
identifying a smallest segment size of the annotator, wherein the smallest segment size corresponds to a smallest document partition that the annotator is configured to annotate;
selecting one of the unannotated second document segments; and
segmenting the selected unannotated second document segment into a plurality of third document segments in response to determining that the selected unannotated second document segment is larger than the smallest segment size.

10. The computer program product of claim 9 wherein the information handling system performs additional actions comprising:
detecting a third annotation error in response to attempting to annotate a selected one of the plurality of third document segments;
segmenting the selected third document segment into a plurality of fourth document segments that each correspond to the smallest segment size;
determining that a selected one of the plurality of fourth document segments generates a fourth annotation error; and
including an identifier in the notification that identifies the selected fourth document segment.

11. The computer program product of claim 9 wherein the information handling system performs additional actions comprising:
annotating each of the plurality of third document segments; and
determining that the annotator successfully annotated each of the plurality of third document segments; and
modifying the smallest segment size to correspond with the selected unannotated second document segment in response to the determining.

12. The computer program product of claim 8 wherein, prior to the detection of the first annotation error, the information handling system performs additional actions comprising:
annotating, by the annotator, one or more baseline documents included in a corpus of documents;
logging a baseline annotation time of the annotator based upon the annotating of the one or more baseline documents; and
logging an annotator feature set corresponding to the annotator, wherein the annotation feature set includes at least one document size and at least one amount of annotations corresponding to at least one of the one or more baseline documents.

13. The computer program product of claim 12 wherein the information handling system performs additional actions comprising:
identifying a document feature set of the first document segment;
computing an estimated annotation time to annotate the document based upon the baseline annotation time in response to determining that the document feature set matches the annotator feature set;
monitoring a current in-process annotation time taken by the annotator while in-process of annotating the first document segment; and
generating the first annotation error in response to determining that the in-process annotation time is longer than the estimated annotation time.

* * * * *